(12) United States Patent
De Vos et al.

(10) Patent No.: US 9,028,304 B2
(45) Date of Patent: May 12, 2015

(54) POULTRY PROCESSING DEVICE AND METHOD FOR POULTRY PROCESSING

(71) Applicant: Meyn Food Processing Technology B.V., Oostzaaan (NL)

(72) Inventors: Ferdinand Allard De Vos, Oostzaan (NL); Pieter Willem Vonk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 289 days.

(21) Appl. No.: 13/630,390

(22) Filed: Sep. 28, 2012

(65) Prior Publication Data

US 2013/0084787 A1    Apr. 4, 2013

(30) Foreign Application Priority Data

Sep. 29, 2011    (NL) .................................... 2007506

(51) Int. Cl.
*A22C 21/00*    (2006.01)
(52) U.S. Cl.
CPC ................................. *A22C 21/0092* (2013.01)
(58) Field of Classification Search
USPC .......................... 452/125, 127–130, 132, 133
See application file for complete search history.

(56) References Cited

U.S. PATENT DOCUMENTS

| | | | | |
|---|---|---|---|---|
| 4,856,143 A * | 8/1989 | Callsen et al. | ................ | 452/130 |
| 6,264,542 B1 * | 7/2001 | Gasbarro | ...................... | 452/125 |
| 6,357,346 B1 | 3/2002 | Townsend | | |
| 6,659,856 B2 * | 12/2003 | Long | ............................. | 452/127 |
| 7,244,174 B2 * | 7/2007 | Schill | ............................ | 452/130 |
| 7,344,437 B2 * | 3/2008 | Van Den Nieuwelaar et al. | ............................ | 452/187 |
| 8,272,927 B2 * | 9/2012 | Gasbarro | ...................... | 452/125 |
| 8,388,421 B2 * | 3/2013 | Janssen et al. | ................ | 452/136 |
| 8,485,870 B2 * | 7/2013 | Janssen et al. | ................ | 452/136 |
| 8,690,646 B1 * | 4/2014 | Kielian et al. | ................ | 452/125 |
| 2011/0092146 A1 | 4/2011 | Gasbarro | | |

OTHER PUBLICATIONS

Search report for NL 2007506, dated May 15, 2012.

* cited by examiner

*Primary Examiner* — Richard Price, Jr.
(74) *Attorney, Agent, or Firm* — Dority & Manning, P.A.

(57) ABSTRACT

A poultry processing device for removing skin from the meat of poultry is provided. The device can include a conveyor line for moving the poultry in their conveying path and one or more de-skinning devices in or adjacent to the conveying path for processing the passing poultry. Each of the de-skinning devices can include a rotatable gripper roll which is circumferentially provided with longitudinally extending teeth having radial ends facing away from a rotational axis of the roll and providing a frictional outer surface to the roll for catching engagement with the skin. Each of the de-skinning devices can further include pinch devices adjacent to the rotatable gripper roll to pinch or trap the skin between the gripper roll and the pinch devices.

16 Claims, 4 Drawing Sheets

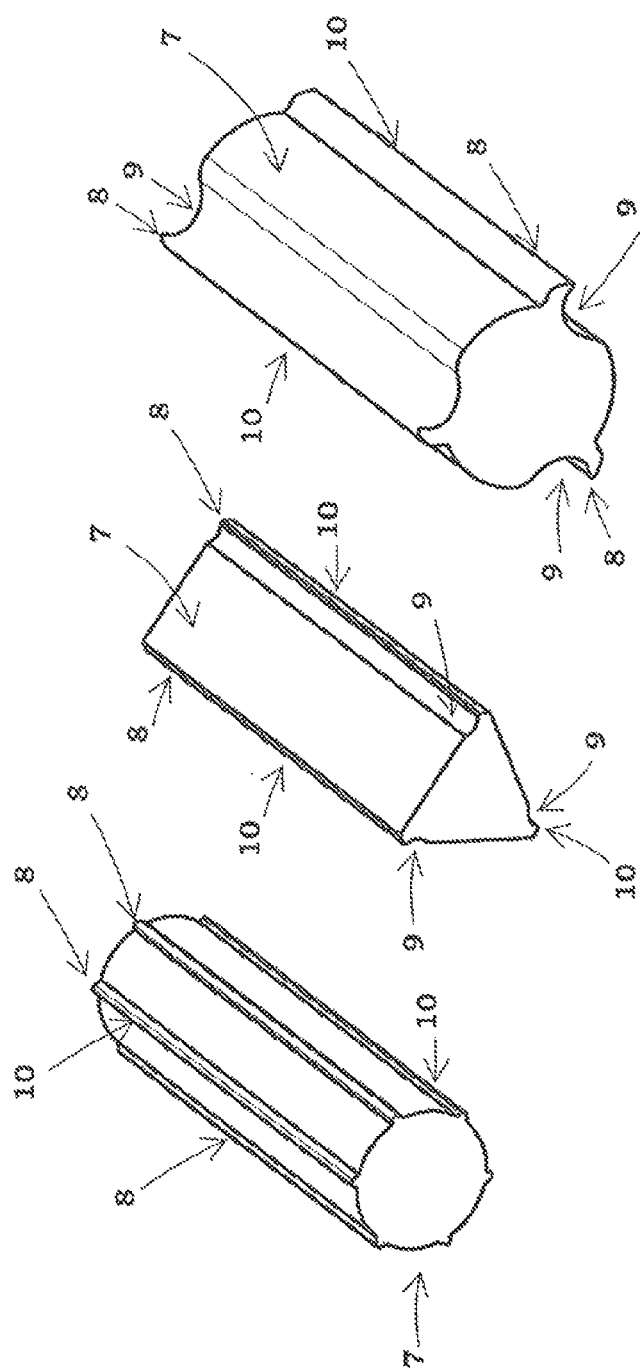

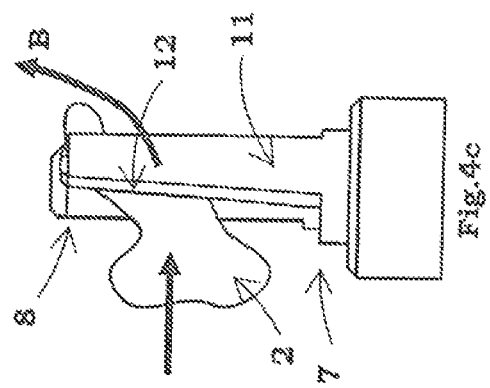
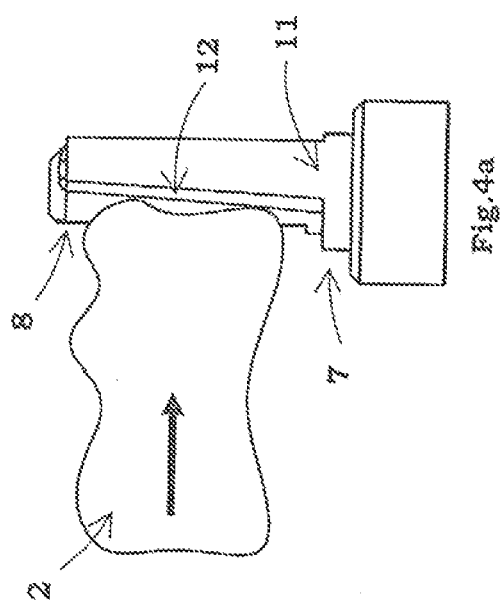
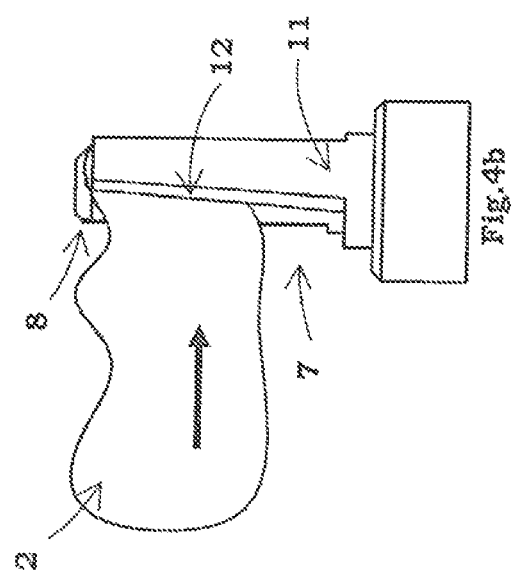

POULTRY PROCESSING DEVICE AND METHOD FOR POULTRY PROCESSING

FIELD OF THE INVENTION

The subject matter of the present disclosure relates generally to a poultry processing device and method for removing skin from the meat of poultry.

BACKGROUND OF THE INVENTION

A conventional, automated apparatus for removing skin from the shoulder and neck areas of a chicken carcass is indicated in US 2011/0092146. The apparatus indicated therein includes first deskinning means and second deskinning means operating as a neck skinner and a shoulder skinner that are mounted to an elongated support wall in a longitudinally spaced relationship. This known apparatus further comprises a conveyor line in the form of a suspension conveyor for moving the suspended poultry along the deskinning means for processing the passing poultry. Each of the deskinning means includes a rotatable gripper roll that is circumferentially provided with longitudinally extending fins or teeth having radial ends facing away from a rotational axis of the roll and providing a frictional outer surface to the roll for catching engagement with the skin. Each of the deskinning means further includes pinch means adjacent to the rotatable gripper roll to pinch or trap the skin between the gripper roll and the pinch means, to which end the pinch means have an edge that mates with the radial ends of the teeth during rotation of the roll.

A first problem with this known poultry processing device is that it frequently requires manual assistance to remove the loosened skin from the deskinning means after the skin is removed from the meat of the poultry.

A second problem is fouling of the frictional outer surface of the roll, which associates with the previous mentioned problem and which also deteriorates the efficiency of the known apparatus in continued use.

A third problem which associates with the first and the second problem is that disruptions in the conveyor line occur when the effectiveness in the removal of skin of the known device is impaired due to untimely removal of the skin from the deskinning means.

A fourth problem is that the known apparatus is unsuitable for removing skin of the back meat of poultry.

SUMMARY OF THE INVENTION

It is an object of the invention to provide a solution to one or more of the above mentioned problems, and to gain advantages which may become apparent from the following disclosure. Additional aspects and advantages of the invention will be set forth in part in the following description, or may be obvious from the description, or may be learned through practice of the invention.

According to an exemplary aspect of the invention, a method and a poultry processing device are proposed in accordance with one or more of the appended claims.

According to a first exemplary aspect of the invention, the edge of the pinch means is extending oblique with respect to the radial ends of the teeth, or—when there is only one tooth—with respect to its radial end. It is with this remarkable feature that huge advantages are attained in that it avoids that the removal of loosened skin from the deskinning means requires any further manual assistance. The loosened skin is effectively and automatically disposed and, as a consequence thereof, fouling of the roll of the deskinning means remains limited, and disruptions in the processing line are greatly reduced. It is further found that the edge being oblique with respect to the radial ends of the teeth of the roll result in better catching of the skin of the poultry meat. In other words: the effectiveness of the device in its principal function is improved.

It is further preferable in exemplary embodiments of the invention that the conveyor line includes carriers for poultry front-halves or breast caps and that there are first deskinning means and second deskinning means adjacent to the conveying line of the carriers, wherein the carriers are arranged to rotate at the moment they are between the first deskinning means and second deskinning means. The application of such carriers for poultry front-halves or breast caps enables for one thing that the deskinning means can be reliably applied for removing the skin from the poultry's back meat. By arranging that the carriers are rotatable at the moment they are between the first deskinning means and second deskinning means, the poultry can be rotated over 180° at the time it moves between the first deskinning means and the second deskinning means. This brings about that while the poultry front halves or breast caps are moved past the first deskinning means and the second deskinning means, the first deskinning means can operate on a first halve part of the poultry back and the second deskinning means can subsequently operate on a second halve part of the poultry back. This improves the reliability that indeed a complete removal of the skin of all back meat is accomplished.

The operational performance of an exemplary device of the invention can be ensured by arranging that the rotational speed of the rotatable gripper roll is synchronized with the conveying speed of the conveyor line.

A further advantageous feature is that in an exemplary embodiment the one or more deskinning means are provided with a preferential position in the direction of the conveying path. For this purpose the deskinning means may be spring-loaded or this can be arranged with for instance a pneumatic buffer cylinder. In this way the poultry processing device of such an exemplary embodiment of the invention automatically accommodates to the dimensions of the poultry that is processed.

It is further preferred for certain exemplary embodiments that each of the teeth of the rotatable gripper roll is provided with a recess longitudinally extending adjacent to each such teeth. This promotes the ease of dispatching the skin that has been removed from the poultry.

It is further found beneficial that the number of teeth of each roll is preselected at a value of at least one for certain exemplary embodiments.

Within the scope of this invention the reference to poultry is deemed to include the reference to poultry parts.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 3A, 3B and 3C shows several embodiments of the rotatable gripper roll which can be used in the poultry processing device of FIG. 1.

FIGS. 4A, 4B and 4C provide a top view at the cooperating gripper roll and pinch means in several subsequent processing stadia wherein the skin is removed from the poultry.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
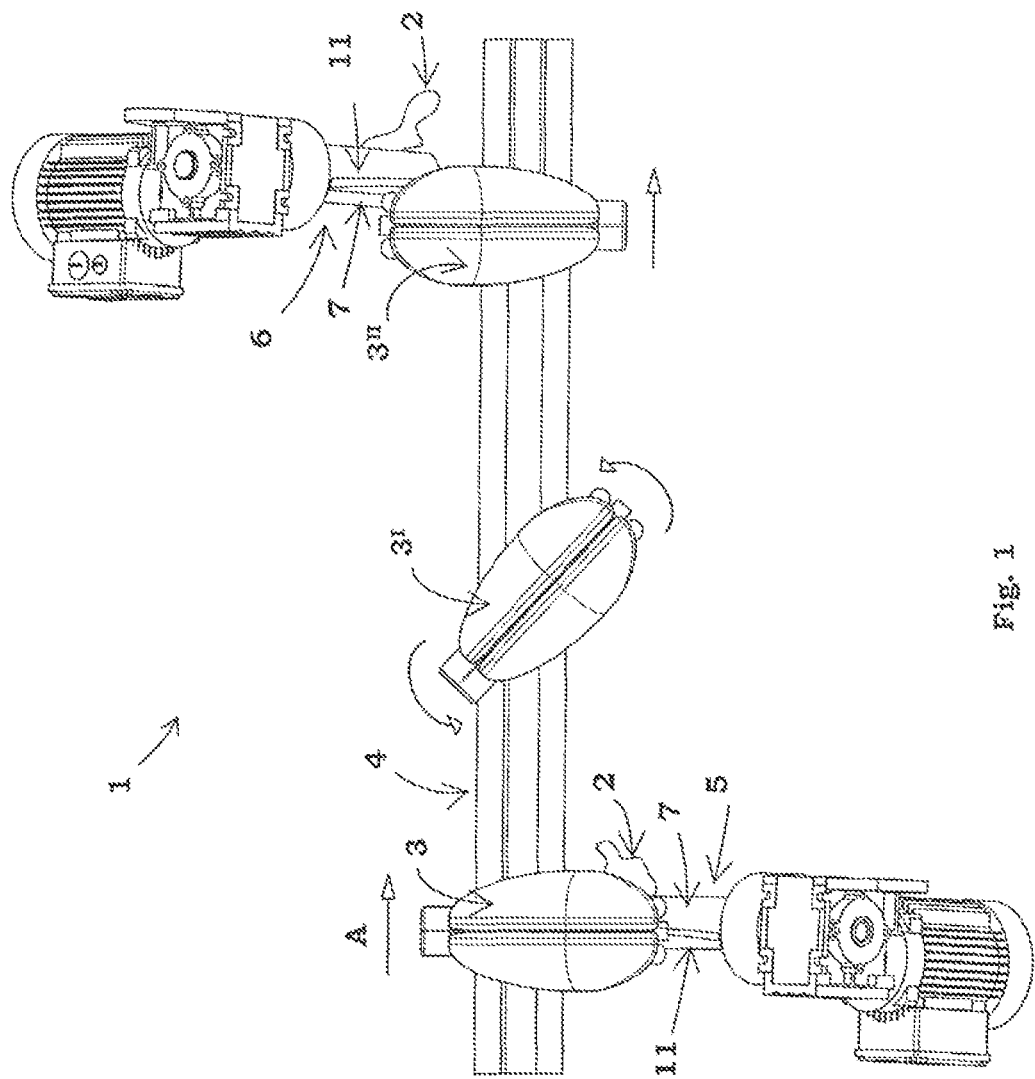
FIG. 1 illustrates a front view of (part of) a poultry processing device in accordance with the invention.

With reference first to FIG. 1, a poultry processing device generally denoted with reference 1 is shown, which is used for removing skin 2 from the meat of poultry 3, 3', 3".

Figure 2:
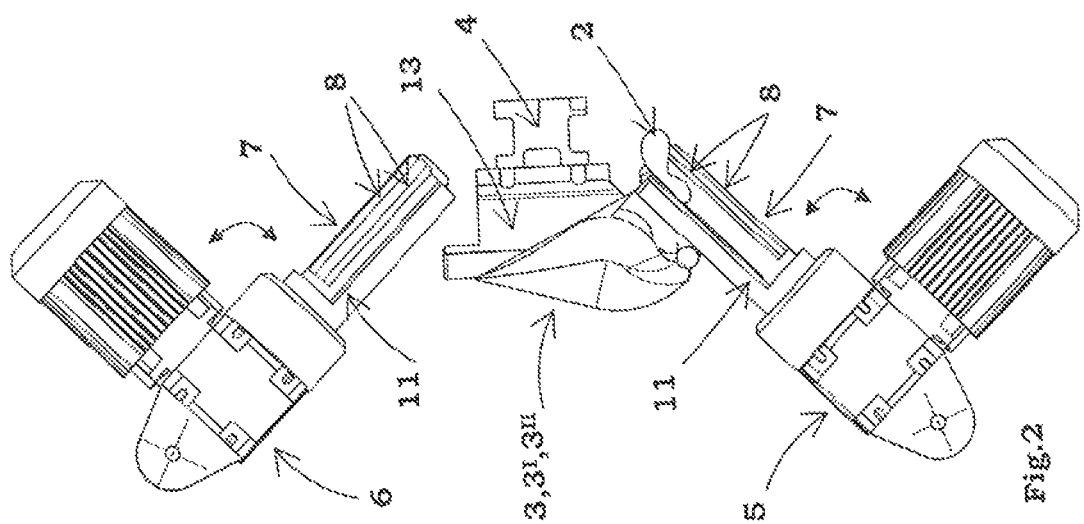
FIG. 2 provides a side view of the device of FIG. 1 as seen in the conveying direction of the poultry.

The poultry processing device 1 includes a conveyor line 4 for moving the poultry 3, 3', 3" in their conveying path in the direction of arrow A. The conveyor line 4 comprises carriers 13 for poultry front-halves or breast caps. See FIG. 2. Both FIGS. 1 and 2 show that there are first deskinning means 5 and second deskinning means 6 adjacent to the path of the conveyor line 4 of the carriers 13. FIG. 1 illustrates that the carriers 13 are arranged to rotate when moving between the first deskinning means 5 and second deskinning means 6 in order to turn the poultry from the position designated with reference 3, via the intermediate position 3' to the reversed position designated with reference 3". The poultry is thus rotated over 180° at the time it moves between the first deskinning means 5 and the second deskinning means 6. In this manner, the first deskinning means 5 can operate on a first halve part of the poultry back and the second deskinning means 6 can operate on a second halve part of the poultry back.

Each of the deskinning means 5, 6 is embodied with a rotatable gripper roll 7 as is more clearly shown in FIG. 2. The gripper rolls 7 are circumferentially provided with longitudinally extending teeth 8 as best shown in the possible embodiments of the gripper roll provided in FIGS. 3A, 3B and 3C respectively. These figures show that the number of teeth 8 of each roll 7 is preselected at a value of three, but it is within the ambit of the invention to apply rolls with only a single tooth or with plural teeth at another number than three.

The teeth 8 of all the embodiments shown in FIGS. 3A, 3B and 3C have radial ends 10 facing away from a rotational axis of the roll 7 and provide a frictional outer surface to the roll 7 for catching engagement with the skin 2 of the poultry 3, 3', 3". Each of the deskinning means 5, 6 further comprises pinch means 11 adjacent to the rotatable gripper roll 7 to pinch or trap the skin 2 between the gripper roll 7 and the pinch means 11.

In FIGS. 4A, 4B and 4C is shown that the pinch means 11 have an edge 12 that mates with the radial ends 10 of the teeth 8 during rotation of the roll 7 and that the edge 12 of the pinch means 11 is extending oblique with respect to the radial ends 10 of the teeth 8. This ensures that the removal of loosened skin 2 from the deskinning means 5, 6 proceeds automatically without manual assistance. The loosened skin 2 is effectively and automatically disposed (eventually in the direction of arrow B) as illustrated in the series of subsequent processing stadia depicted in FIGS. 4A, 4B and 4C respectively. As a consequence thereof, fouling of the roll 7 of the deskinning means 5, 6 remains limited, and disruptions in the processing line 4 are greatly reduced. This can be further promoted by the preferential feature shown in FIGS. 3B and 3C that each of the teeth 8 of the rotatable gripper roll 7 is provided with a recess 9 longitudinally extending adjacent to each of such teeth 8.

It is further found that the edge 12 being oblique with respect to the radial ends 10 of the teeth 8 of the roll 7 result in better catching of the skin 2 of the poultry meat.

Finally it can be remarked that it is advantageous that the rotational speed of the rotatable gripper roll 7 is synchronized with the conveying speed of the conveyor line 4, and that preferably, for certain embodiments, the one or more deskinning means 5, 6 are spring-loaded or provided with other means to give them a preferential position in the direction of the path of the conveying line 4. This latter feature assists in automatically accommodating the device of the invention to differing dimensions of the poultry being processed.

As will be apparent for the person skilled in the art the foregoing description is nonlimiting with respect to the appended claims. The scope of protection afforded by the appended claims is merely determined by their wording and the foregoing is only intended to remove any possible ambiguity of these claims. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments.

The invention claimed is:

1. A poultry processing device for removing skin from the meat of poultry, comprising:
    a conveyor line for moving the poultry along a path of the conveyor line, the conveyor line comprising carriers for poultry front-halves or breast caps;
    one or more deskinning means in or adjacent to said conveying line for processing the passing poultry, wherein each of the deskinning means comprises
    a rotatable gripper roll that is circumferentially provided with at least one longitudinally extending tooth having a radial end facing away from a rotational axis of the roll and providing a frictional outer surface to the roll for catching engagement with the skin
    pinch means adjacent to the rotatable gripper roll to pinch or trap the skin between the gripper roll and the pinch means, the pinch means having an edge that mates with the radial ends of the at least one tooth during rotation of the roll, wherein the edge of the pinch means extends obliquely with respect to the radial end of the at least one tooth; and
    first deskinning means and second deskinning means adjacent to the conveying line of the carriers, wherein the carriers are arranged to rotate between the first deskinning means and the second deskinning means.

2. A poultry processing device as in claim 1, wherein a rotational speed of the rotatable gripper roll is synchronized with the conveying speed of the conveyor line.

3. A poultry processing device as in claim 1, wherein the one or more deskinning means are provided with a preferential position in the direction of the conveying line.

4. A poultry processing device as in claim 1, wherein each tooth of the rotatable gripper roll is provided with a recess longitudinally extending adjacent to each such tooth.

5. A poultry processing device as in claim 1, wherein the number of teeth of each roll is preselected at a value of at least one.

6. A poultry processing device as in claim 1, wherein the number of teeth of each roll is preselected at a value of at least three.

7. A method for removing skin from the meat of poultry, comprising the steps of:
    moving poultry front-halves or breast caps in a conveyor line past first deskinning means and second deskinning means for removing the skin from the poultry's back meat, wherein the first deskinning means operates on a first halve part of the poultry back and the second deskinning means operates on a second halve part of the poultry back.

8. A method for removing skin from the meat of poultry as in claim 7, wherein the poultry is rotated over 180° at the time it moves between the first deskinning means and the second deskinning means.

9. A poultry processing device for removing skin from the meat of poultry, comprising:
    a conveyor line for moving the poultry along a conveyor path, the conveyor path defining a conveying direction;
    a first deskinning means positioned adjacent to the conveyor path;
    a second deskinning means positioned adjacent to the conveyor path, the second deskinning means positioned downstream along the conveying direction from the first deskinning means, the second deskinning means also positioned on an opposite side of the conveyor path from the first deskinning means;
    wherein the first deskinning means and the second deskinning means each comprise
    a rotatable gripper roll with a frictional outer surface for catching engagement with the skin of the poultry; and
    pinch means positioned adjacent to the rotatable gripper roll to pinch or trap the skin between the gripper roll and the pinch means.

10. The poultry processing device of claim 9, wherein the conveyor line comprises a plurality of carrier for supporting the poultry as the poultry is moved along the conveying path, wherein each carrier is arranged to rotate along the conveyor path between the first deskinning means and the second deskinning means.

11. The poultry processing device of claim 10, wherein the poultry is rotated at least 180 degrees as the carrier moves between the first deskinning means and the second deskinning means.

12. The poultry processing device of claim 9, wherein the rotatably gripper roll comprises a longitudinally extending tooth along a circumference of the gripper roll, the tooth having a radial end facing away from a rotational axis of the roll.

13. The poultry processing device of claim 12, wherein the pinch means comprises an edge that mates with the radial end of the tooth during rotation of the roll.

14. The poultry processing device of claim 13, wherein the edge of the pinch means extends obliquely with respect to the radial end of the tooth.

15. The poultry processing device of claim 14, wherein the tooth of the gripper roll is provided with a recess that extends longitudinally adjacent to the tooth.

16. The poultry processing device of claim 9, wherein the rotatable gripper roll has a rotational speed that is synchronized with a conveying speed of the conveyor line.

* * * * *